Nov. 14, 1967    R. B. DYOTT    3,353,039
MAGNETOHYDRODYNAMIC GENERATORS
Filed Oct. 8, 1963                                3 Sheets-Sheet 1

INVENTOR
RICHARD BURNABY DYOTT
BY
ATTORNEYS

Nov. 14, 1967 R. B. DYOTT 3,353,039
MAGNETOHYDRODYNAMIC GENERATORS
Filed Oct. 8, 1963 3 Sheets-Sheet 2

INVENTOR
RICHARD BURNABY DYOTT
ATTORNEYS

3,353,039
MAGNETOHYDRODYNAMIC GENERATORS
Richard Burnaby Dyott, Chalfont St. Peter, England, assignor to The M-O Valve Company Limited, London, England
Filed Oct. 8, 1963, Ser. No. 314,732
Claims priority, application Great Britain, Oct. 8, 1962, 37,977/62
6 Claims. (Cl. 310—11)

This invention relates to magnetohydrodynamic generators, that is to say electric generators of the kind wherein, in operation, a conducting fluid is forced through a magnetic field in a direction transverse to the direction of the lines of force of the field. In operation of such a generator, a potential gradient is produced in a direction perpendicular to the directions both of the flow of fluid and of the lines of force of the magnetic field. An electrical output may therefore be derived from such a generator by means such as an inductive circuit or a pair of electrodes disposed at appropriate positions with respect to the flow of conducting fluid and the lines of force of the magnetic field.

One of the principal difficulties encountered with such a generator is that of obtaining a sufficiently high conductivity in the conducting fluid to permit the extraction of useful amounts of electrical power from the generator. It is an object of the present invention to provide a magnetohydrodynamic generator which is improved in this respect.

According to the present invention a magnetohydrodynamic generator includes means for modulating the velocity of the flow of said fluid at a position upstream of said magnetic field by introducing pressure waves into said flow of fluid, thereby causing the velocity of the flow of fluid at said upstream position to vary cyclically about a mean value in such a manner as to cause periodic bunching of the particles in said fluid in the region of said magnetic field.

Four magnetohydrodynamic generators in accordance with the invention will now be described, by way of example, with reference to the accompanying drawings in which FIGURES 1, 2, 3 and 4 are respectively schematic diagrams of the four generators.

Figure 1:
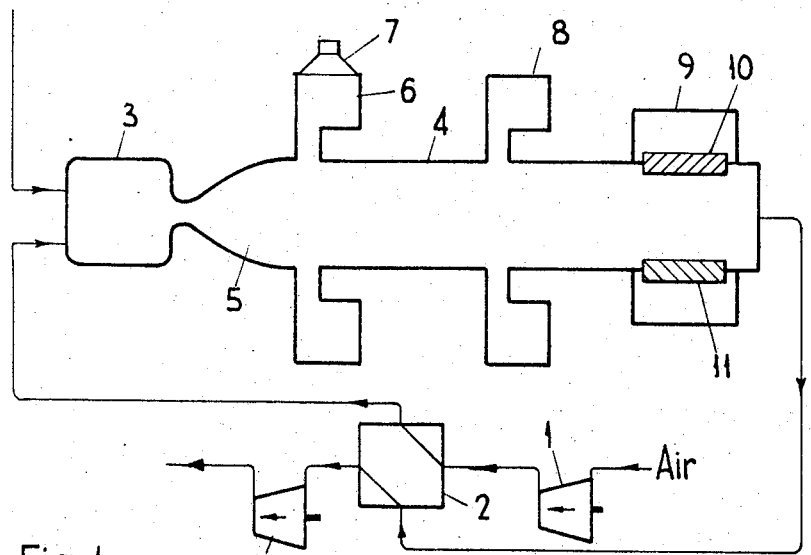

Referring to FIGURE 1 of the drawings, the first generator to be described includes a compressor 1 by means of which air from the atmosphere is compressed and fed to a heat exchanger 2 wherein the compressed air is raised to a high temperature. The hot compressed air is fed from the heat exchanger 2 to a combustion chamber 3 which opens into an elongated tube 4 made of an electrically insulating material via a convergent-divergent nozzle 5.

A supply of a suitable fuel is also fed to the combustion chamber 3 at a substantially constant rate, depending on the output power required from the generator. In the chamber 3 the fuel is burnt with the hot compressed air to produce a supply of hot conductive gas at a very high pressure. This gas expands adiabatically through the nozzle 5 so as to produce a flow of gas in the tube 4 at a speed appreciably above the speed of sound in the gas, this expansion being accompanied by a corresponding drop in the temperature and pressure and hence in the electrical conductivity of the gas.

At a position adjacent the end of the tube 4 nearer the combustion chamber 3 there is provided an acoustic resonator 6 in the form of annular enclosure in the inner wall of which is formed an annular aperture via which the resonator 6 communicates with the interior of the tube 4. In the outer wall of the resonator 6 there is disposed a loudspeaker 7 by means of which an acoustic oscillation is set up in the resonator 6. The oscillation set up in the resonator 6 interacts with the flow of gas in the tube 4 so as to velocity modulate the flow of gas; as a result, in accordance with known principles, periodic bunching of the particles in the gas occurs at a certain distance along the tube 4 from the resonator 6 in the direction of the flow of gas. At this position there is provided a second acoustic resonator 8 substantially identical in shape with the resonator 6, in which an acoustic oscillation is set up by the velocity modulated gas stream, this oscillation being an amplified replica of the oscillation set up in the resonator 6.

The oscillation set up in the resonator 8, in turn velocity modulates the flow of gas in the tube 4 so that further periodic bunching of the particles in the gas, of increased amplitude, occurs at a distance along the tube 4 from the resonator 8 in the direction of gas flow equal to the distance between the two resonators 6 and 8. At this second bunching position there is provided a magnet 9 which produces a magnetic field whose lines of force traverse the flow of gas in the tube 4 at right angles. In consequence, a potential difference is produced between two insulated electrodes 10 and 11 respectively disposed on opposite sides of the tube 4 on a line extending in a direction mutually perpendicular to the flow of gas in the tube 4 and the direction of thhe magnetic lines of force in the area of the tube 4. It will be appreciated that, in the drawing, the direction of the lines of force in the area of the tube 4 is perpendicular to the paper.

From the end of the tube 4 remote from the combustion chamber 3 the gas is fed to the heat exchanger 2 where it is used to heat the compressed air supplied to the combustion chamber 3. The cooled gas is then compressed to atmospheric pressure in a compressor 12 and released to the atmosphere.

In operation of the generator an electrical output may be derived from between the electrodes 10 and 11, the quantity of electrical power which may be derived being dependent upon the electrical conductivity of the gas between the electrodes 10 and 11. In the arrangement described above, the temperature and pressure of the gas in the bunches appearing between the electrodes 10 and 11, and hence the conductivity of the gas in these bunches is appreciably higher than the temperature and pressure, and hence the conductivity, of the gas in the gas stream before velocity modulation. Hence larger powers may be derived from the generator as a result of the velocity modulation.

It will be noticed that the magnitude of the potential appearing between the electrodes 10 and 11 pulsates at the modulation frequency.

It will be understood that in other arrangements in accordance with the invention velocity modulation of the flow of fluid may be obtained by means other than that described above, by way of example.

Figure 4:
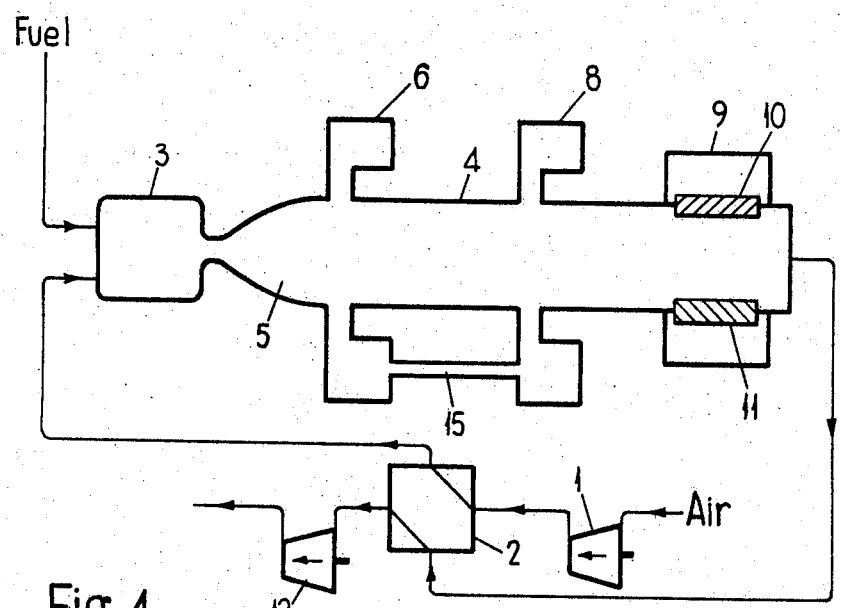

Referring now to FIGURE 4, in one such arrangement the loudspeaker 7 is omitted and the resonator 8 is acoustically coupled to the resonator 6 via a tube 15 so as to provide positive feedback to the 6 resonator from the resonator 8. The two resonators 6 and 8 are thus connected in an oscillating arrangement in which oscillations are maintained once they have been initiated due to random disturbances.

Figure 2:
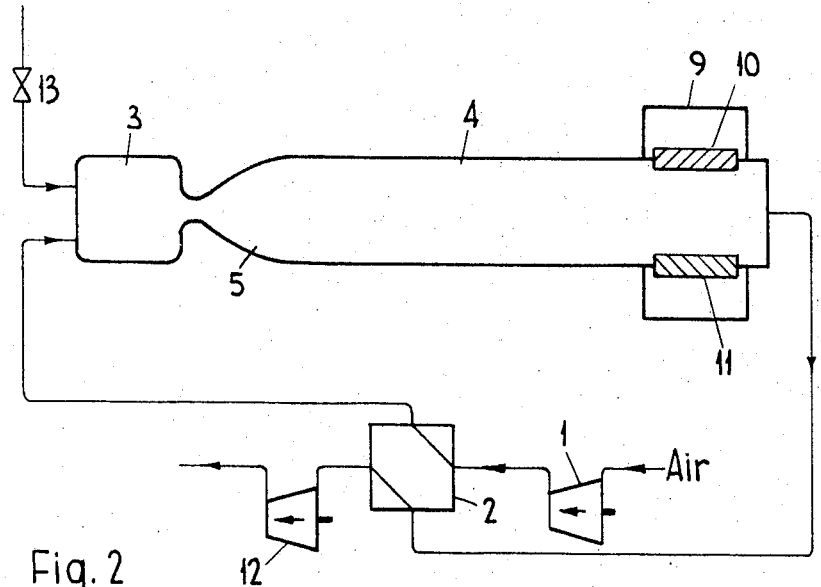

Referring now to FIGURE 2, in a second such arrangement the resonators 6 and 8 are both omitted and velocity modulation of the gas flow is achieved by injecting fuel into the chamber 3 in a periodic manner, thus causing the pressure of the gas in the chamber 3 to vary in a periodic manner. To this end the fuel is passed to the chamber 3 via a valve 13 which is arranged to open and shut in a suitable periodic manner.

Figure 3:
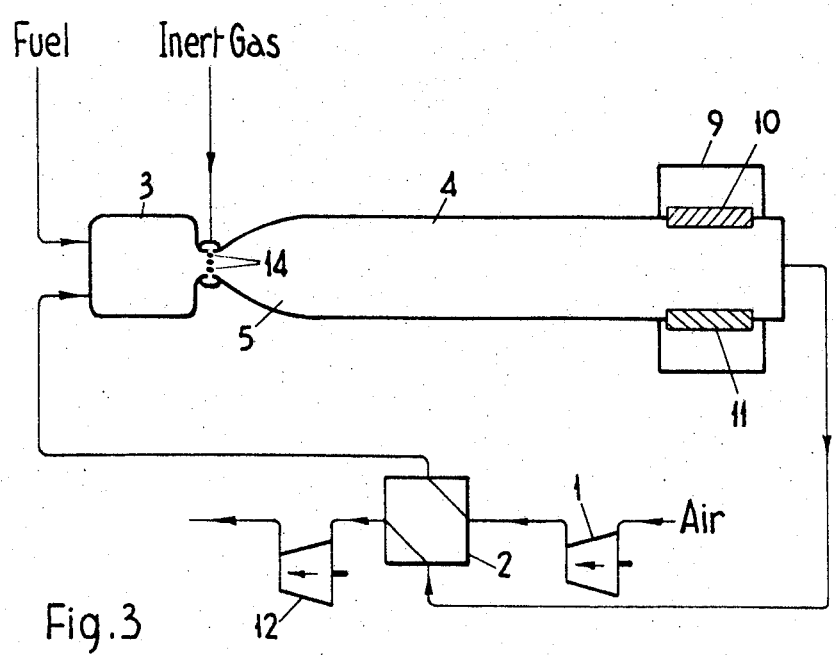

Referring now to FIGURE 3, in a third such arrangement the resonators 6 and 8 are again omitted and velocity modulation is achieved by changing the effective profile of the nozzle 4 in a periodic manner. For this purpose, a plurality of apertures 14 are formed through the wall of the nozzle 4 at equally spaced positions around the circumference of the nozzle 4, and an inert gas is passed via these apertures into the nozzle 4 at a pressure which varies in a suitable periodic manner.

By way of further explanation, the manner in which the distance at which bunching occurs from the point of velocity modulation may be determined will now be explained.

Considering a flow of gas travelling at a speed $Uo$, acoustic velocity modulation of the flow by a stationary wave produces two waves whose wavefronts respectively travel in the direction of the original flow at speeds $$Uo+Us \text{ and } Uo-Us$$

where $Us$ is the velocity of sound in the gas.

The propagation constants of these two waves are respectively $$\frac{w}{Uo+Us} \text{ and } \frac{w}{Uo-Us}$$

where $w$ is the angular frequency of the modulating wave. It may be shown that the two waves beat together to produce a difference wave having a propagation constant $\beta$, where $$\beta = \frac{w}{Uo-Us} - \frac{w}{Uo+Us} = w\frac{2Us}{Uo^2-Us^2}$$

The distance $Z$ between the point of velocity modulation and the point at which bunching occurs is given by the expression:

$$\beta Z = \pi$$

Hence $$Z = \frac{UsUo^2}{4fUs^2} - 1$$

where $f$ represents the frequency of the modulating wave.

The theoretical temperature of the gas in the bunches is given by the following expression:

$$1 + \frac{Uo}{Us} = \left[\left(\frac{T2}{T1}-1\right)\frac{2}{\gamma-1}\right]^{1/2}$$

where $T1$ represents the absolute temperature of the gas before modulation;

$T2$ represents the maximum absolute temperature of the gas in the bunches; and $\gamma$ represents the ratio of the specific heats of the gas at constant pressure and constant volume.

I claim:

1. An electric generator comprising means for producing a magnetic field, means for forcing a conducting fluid at supersonic velocity along a path which passes through the magnetic field in a direction transverse to the direction of the lines of force of the field, means located adjacent the position at which said path passes through the field for deriving an electrical output, and means for modulating the velocity of the flow of said fluid by introducing pressure waves into said flow of fluid, thereby causing the velocity of the flow of fluid at the modulation position to vary cyclically about a mean value in such a manner as to cause periodic bunching of the particles in said fluid at a position downstream of said means for modulating the velocity, said means for modulating the velocity being positioned upstream of said magnetic field by an amount such that said periodic bunching occurs in the region of said magnetic field.

2. A generator according to claim 1 including a substantially tubular enclosure along which said flow of fluid takes place and wherein said modulating means comprises an acoustic resonator acoustically coupled with the interior of said enclosure and means for maintaining acoustic oscillations within said resonator.

3. A generator according to claim 2 wherein said means for maintaining acoustic oscillations within said resonator comprises a second acoustic resonator acoustically coupled to said tubular enclosure at a position spaced from the first-mentioned resonator, such that periodic bunching of the particles in said fluid in the region of said first-mentioned resonator will occur in response to the occurence of oscillations in the second resonator, and an acoustic coupling between the first-mentioned resonator and the second resonator whereby positive feedback to the second resonator from the first-mentioned resonator is provided.

4. A generator according to claim 2 wherein said means for maintaining acoustic oscillations within said resonator comprises a second acoustic resonator acoustically coupled to said tubular enclosure at a position spaced from the first-mentioned resonator such that periodic bunching of the particles in said fluid in the region of said first-mentioned resonator will occur in response to the occurence of oscillations in the second resonator, and means for setting up an acoustic oscillation in said second resonator.

5. A generator according to claim 1 including a subtantially tubular enclosure along which said flow of fluid takes place, a chamber which communicates with said tubular enclosure at one end of the enclosure via a nozzle having a relatively small cross-sectional area compared with said enclosure, and means for producing a supply of said fluid in said chamber at a high pressure, and wherein said modulating means comprises means for periodically changing the effective profile of said nozzle.

6. A generator according to claim 1 including a substantially tubular enclosure along which said flow of fluid takes place, a chamber which communicates with said tubular enclosure at one end of the enclosure via a nozzle having a relatively small cross-sectional area compared with said enclosure, and means for supplying fuel to said chamber, the fuel being burnt within the chamber to produce a supply of said fluid at a high pressure within said chamber, and wherein said modulating means comprises means for periodically varying the rate of supply of fuel to said chamber.

References Cited
UNITED STATES PATENTS

| | | | |
|---|---|---|---|
| 1,916,076 | 6/1933 | Rupp | 310—11 |
| 3,120,621 | 2/1964 | Gunther | 310—11 |
| 3,127,528 | 3/1964 | Lary | 310—11 |
| 3,162,781 | 12/1964 | Beckwith et al. | 310—11 |
| 3,201,622 | 8/1965 | Thring | 310—11 |

MILTON O. HIRSHFIELD, *Primary Examiner.*

D. X. SLINEY, *Assistant Examiner.*